United States Patent [19]
Adachi

[11] Patent Number: 6,028,711
[45] Date of Patent: Feb. 22, 2000

[54] READING LENS

[75] Inventor: Yuka Adachi, Aichi-ken, Japan

[73] Assignee: Asahi Kogaku Kogyo Kabushiki Kaisha, Tokyo, Japan

[21] Appl. No.: 09/124,968

[22] Filed: Jul. 30, 1998

[30] Foreign Application Priority Data

Jul. 31, 1997 [JP] Japan .................................. 9-219892

[51] Int. Cl.[7] ...................................................... G02B 3/00
[52] U.S. Cl. ........................................... 359/642; 359/784
[58] Field of Search ................................. 359/784–792, 359/642

[56] References Cited

U.S. PATENT DOCUMENTS

| | | |
|---|---|---|
| 4,863,250 | 9/1989 | Ishizuka . |
| 4,943,146 | 7/1990 | Iizuka . |
| 4,974,948 | 12/1990 | Arai et al. . |
| 5,412,510 | 5/1995 | Iizuka et al. . |
| 5,629,799 | 5/1997 | Maruyama et al. . |
| 5,691,835 | 11/1997 | Iizuka . |
| 5,706,141 | 1/1998 | Abe . |
| 5,715,090 | 2/1998 | Meyers .................................. 359/565 |
| 5,737,112 | 4/1998 | Iizuka . |

FOREIGN PATENT DOCUMENTS 9119255  5/1993  Japan .

Primary Examiner—Georgia Epps
Assistant Examiner—Michael Lucas
Attorney, Agent, or Firm—Greenblum & Bernstein, P.L.C.

[57] ABSTRACT

Disclosed is a reading lens consisting of one glass lens and first and second plastic lenses. A positive diffraction lens structure being is formed on one surface of the surfaces of the first and second plastic lenses. The positive diffraction lens structure functions at least to compensate a longitudinal chromatic aberration which is caused by refractive power of the glass lens and the first and second plastic lenses.

9 Claims, 12 Drawing Sheets

FIG. 1
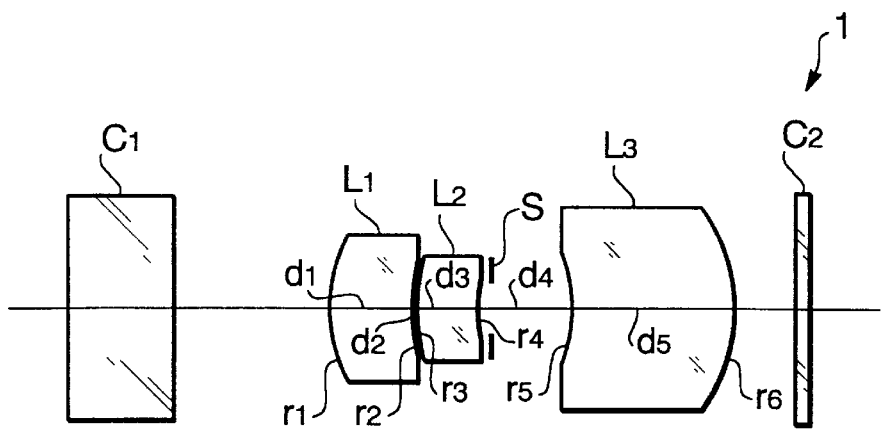
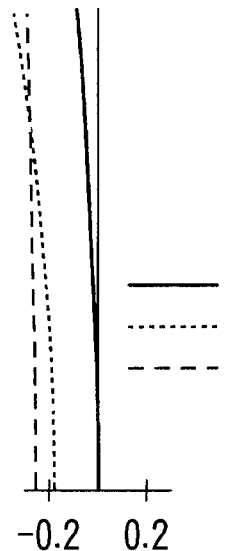
FIG. 2A
1:6.0
—— 540nm
······ 450nm
--- 620nm
-0.2  0.2
SPHERICAL
ABERRATION
CHROMATIC
ABERRATION
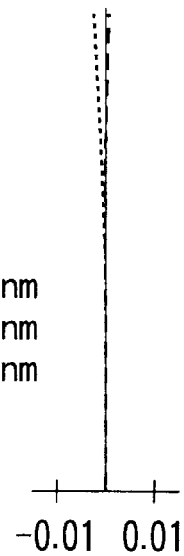
FIG. 2B
w=10.8°
-0.01  0.01
LATERAL
CHROMATIC
ABERRATION
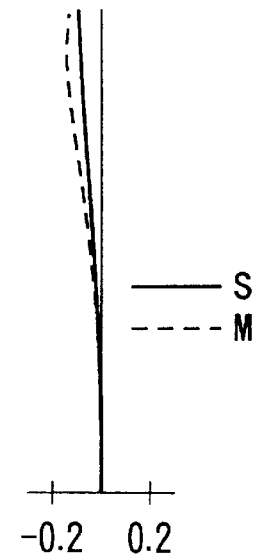
FIG. 2C
w=10.8°
—— S
--- M
-0.2  0.2
ASTIGMATISM
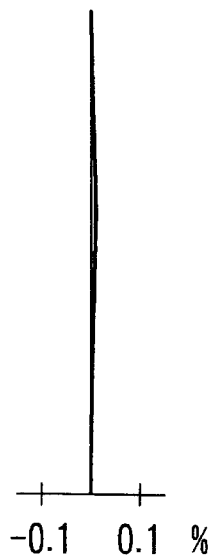
FIG. 2D
w=10.8°
-0.1  0.1  %
DISTORTION

1:6.0

——— 540nm
········· 450nm
- - - - 620nm

-0.2   0.2

SPHERICAL
ABERRATION
CHROMATIC
ABERRATION w=10.8°

-0.01  0.01

LATERAL
CHROMATIC
ABERRATION w=10.8°

——— S
- - - M

-0.2   0.2

ASTIGMATISM w=10.8°

-0.1   0.1  %

DISTORTION

SPHERICAL ABERRATION CHROMATIC ABERRATION

LATERAL CHROMATIC ABERRATION

ASTIGMATISM

DISTORTION

FIG. 7
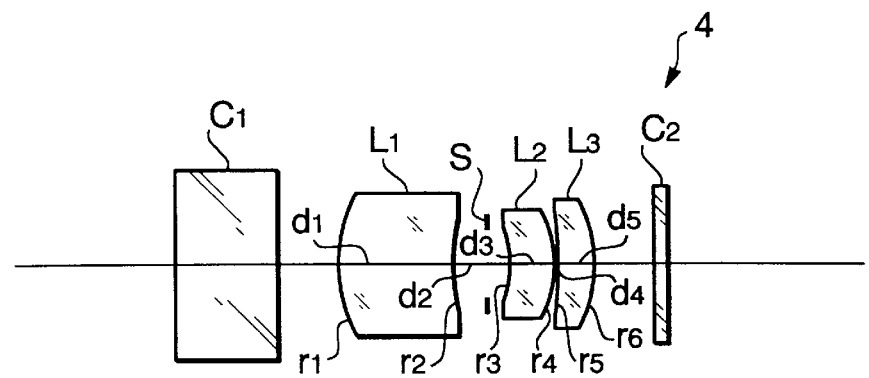
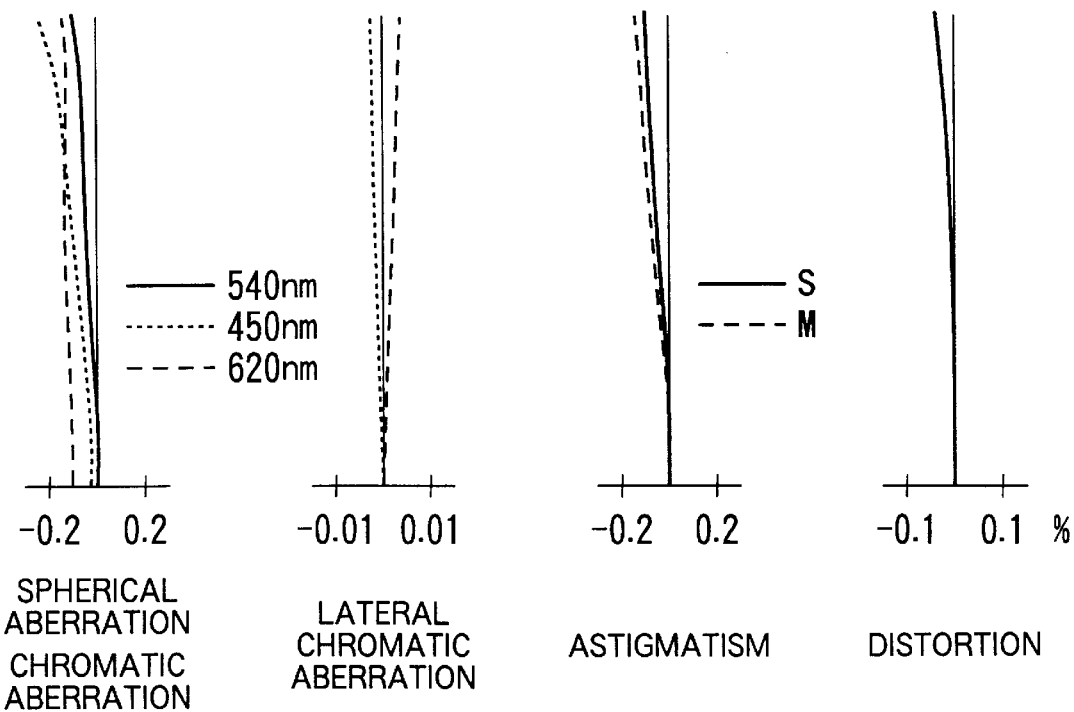

FIG.11
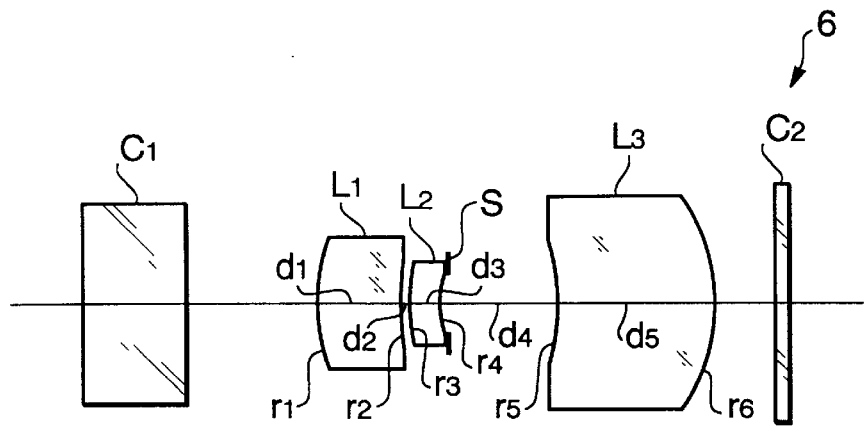
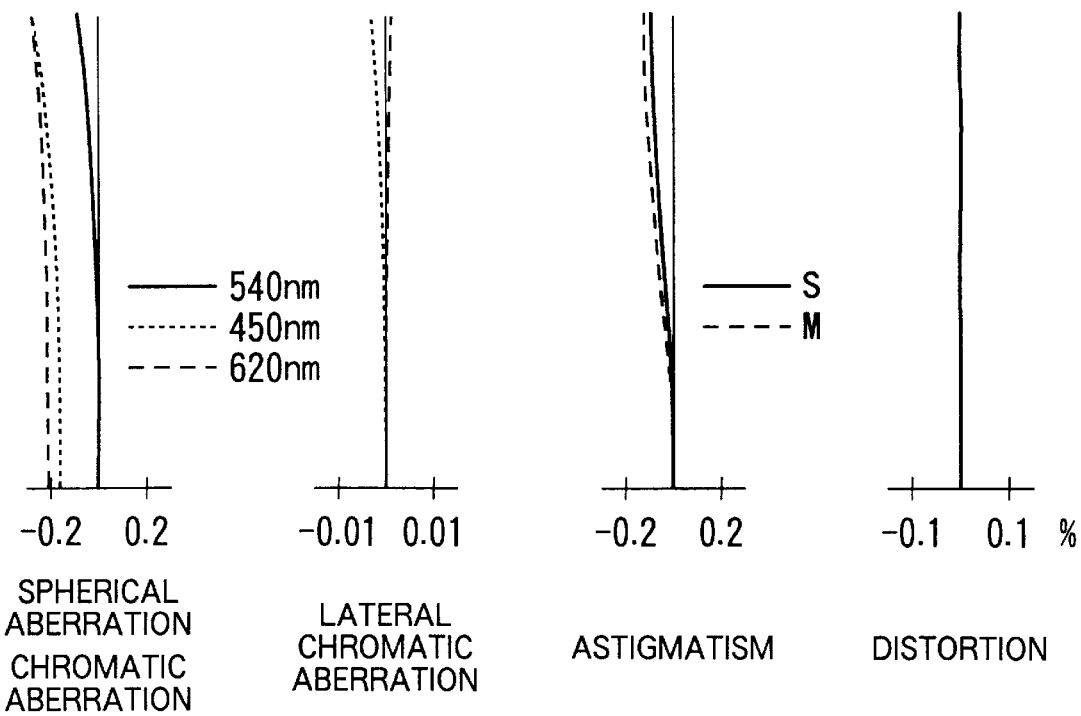
FIG.12A — 1:6.0 — SPHERICAL ABERRATION CHROMATIC ABERRATION — 540nm, 450nm, 620nm — −0.2 to 0.2
FIG.12B — w=11.3° — LATERAL CHROMATIC ABERRATION — −0.01 to 0.01
FIG.12C — w=11.3° — ASTIGMATISM — S, M — −0.2 to 0.2
FIG.12D — w=11.3° — DISTORTION — −0.1 to 0.1 %

FIG.13
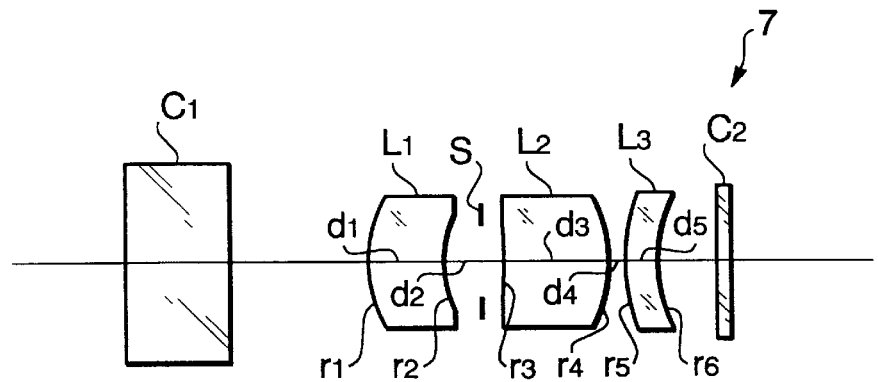
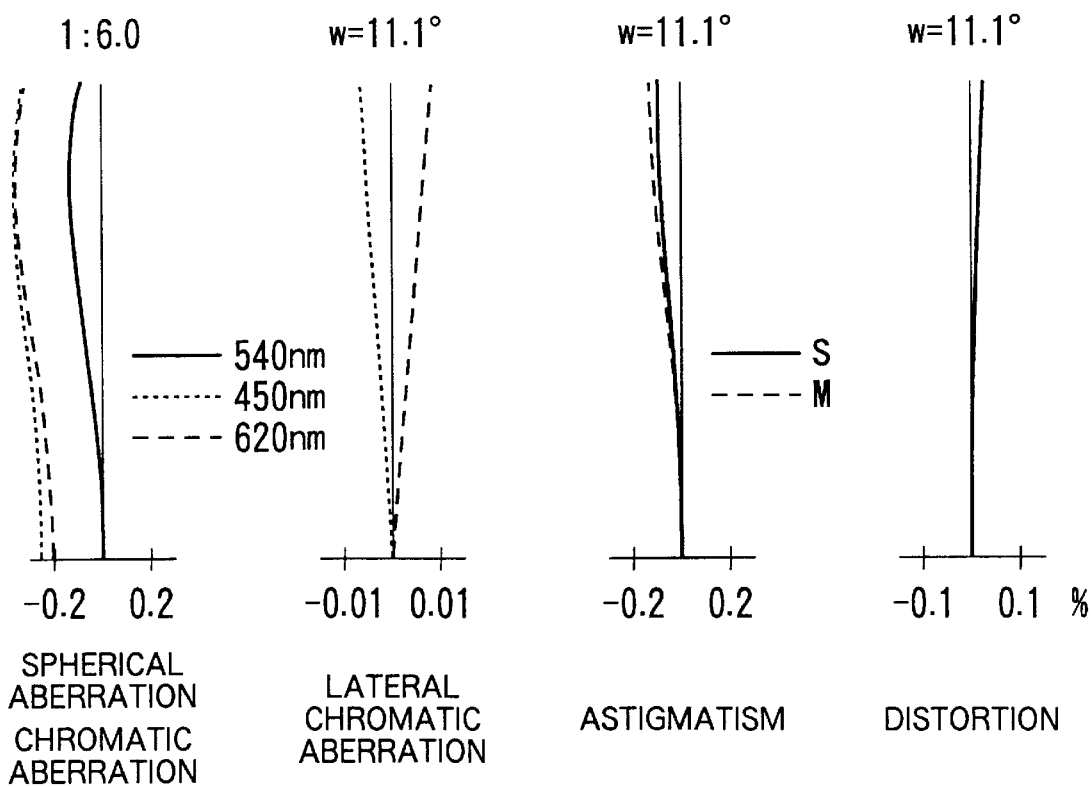
FIG.14A  FIG.14B  FIG.14C  FIG.14D
SPHERICAL ABERRATION CHROMATIC ABERRATION
LATERAL CHROMATIC ABERRATION
ASTIGMATISM
DISTORTION

FIG.17
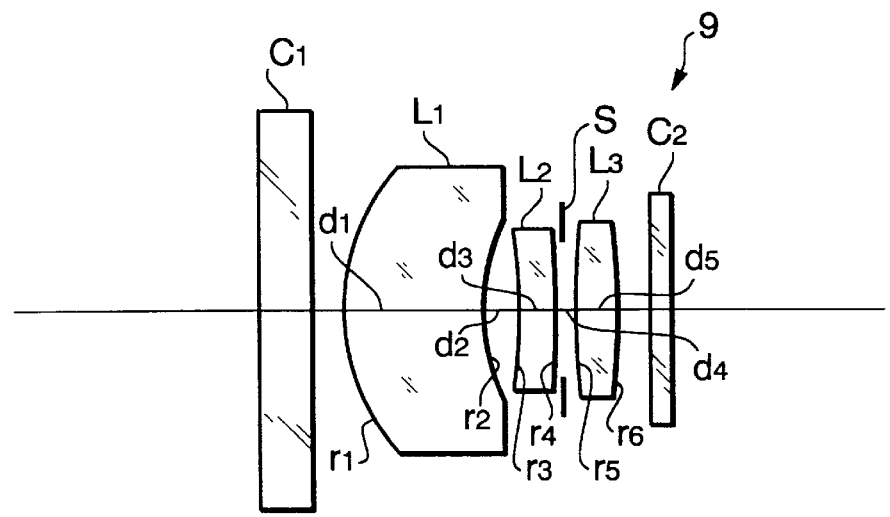
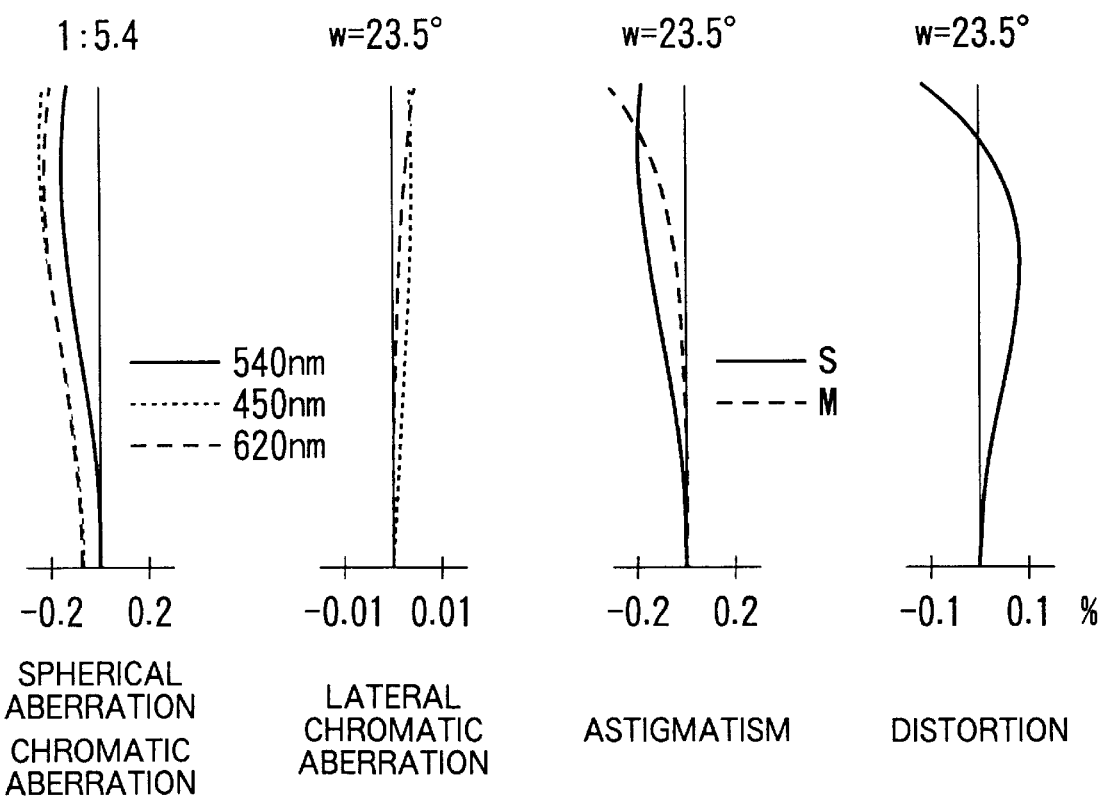
FIG.18A    FIG.18B    FIG.18C    FIG.18D
SPHERICAL ABERRATION CHROMATIC ABERRATION
LATERAL CHROMATIC ABERRATION
ASTIGMATISM
DISTORTION

1:7.0

—— 540nm
······ 450nm
- - - 620nm

-0.2   0.2

SPHERICAL
ABERRATION
CHROMATIC
ABERRATION w=23.6°

-0.01  0.01

LATERAL
CHROMATIC
ABERRATION w=23.6°

—— S
- - - M

-0.2   0.2

ASTIGMATISM w=23.6°

-0.1   0.1  %

DISTORTION

FIG.23
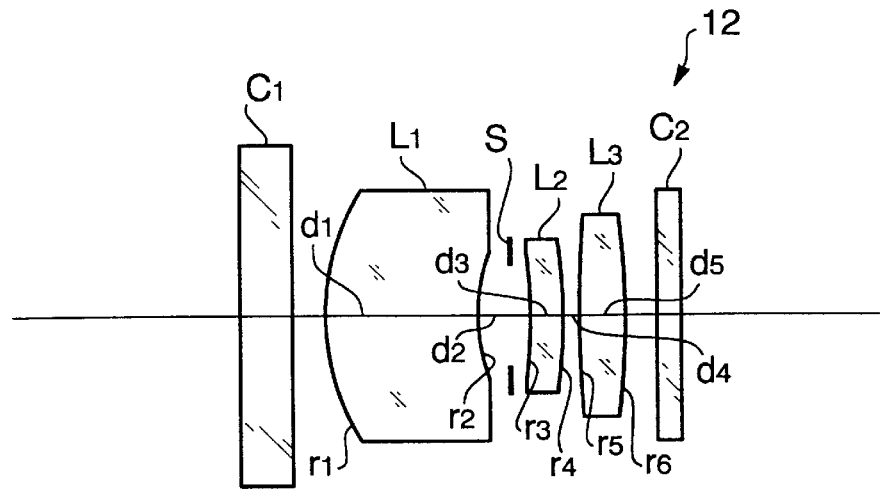
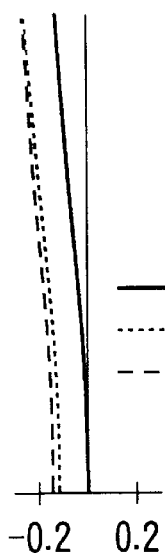
FIG.24A
1:7.0
— 540nm
······ 450nm
---- 620nm
-0.2   0.2
SPHERICAL
ABERRATION
CHROMATIC
ABERRATION
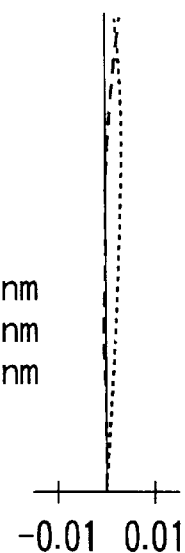
FIG.24B
w=23.5°
-0.01  0.01
LATERAL
CHROMATIC
ABERRATION
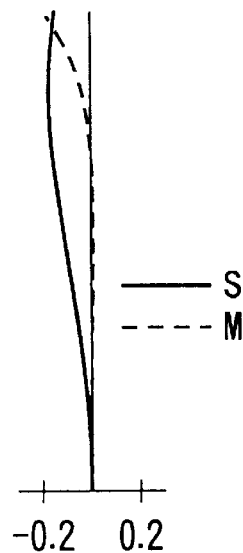
FIG.24C
w=23.5°
—— S
---- M
-0.2   0.2
ASTIGMATISM
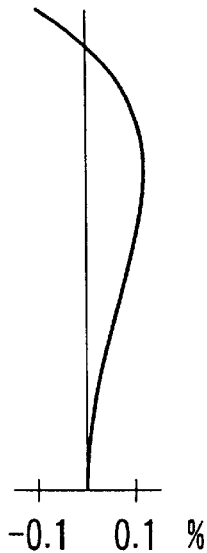
FIG.24D
w=23.5°
-0.1   0.1  %
DISTORTION

READING LENS

BACKGROUND OF THE INVENTION

The present invention relates to a reading lens to be employed in an image scanner or the like, and more particularly, to a reading lens whose chromatic aberration is suppressed so as to be applicable to a color image scanner or the like.

In accordance with recent requirement of reductions in size and/or price of image scanners, fax machines or the like, it has also been required that the size and/or the price of a reading lens applicable to such an apparatus is to be reduced. An example of the reading lens is disclosed in Japan patent provisional publication No. HEI 5-119255 which teaches a triplet-type reading lens. In the publication, the costs of a triplet-type reading lens is reduced by employing two plastic lenses.

In the reading lens disclosed in the above publication, since the plastic lenses have intensive power, the reading lens is designed to compensate variation of power of the plastic lenses by assigning positive and negative powers to respective plastic lenses to counterbalance the power variation thereof due to change of temperature. However, considerable deterioration in performance due to power variation of the plastic lens may be caused as environmental conditions other than temperature, e.g., humidity changes, and such conditions should also be taken into consideration.

Further, in the above-described conventional reading lens, despite the lens having an intensive negative power is employed, longitudinal chromatic aberration is relatively large, and therefore it is not applicable to a color image scanner or the like.

Another example of a conventionally known triplet-type reading lens is configured such that a glass lens having an intensive positive power and a pair of plastic lenses respectively having relatively weak positive and negative powers. In such a reading lens, since the power of the negative lens is weak, longitudinal chromatic aberration is large, and therefore it can not be employed as a reading lens in a color image scanner or the like.

SUMMARY OF THE INVENTION

It is therefore an object of the present invention to provide an improved reading lens having a triplet lens configuration including two plastic lenses and is capable of effectively correcting longitudinal chromatic aberration.

For the above purpose, according to the present invention, there is provided a reading lens consisting of one glass lens and first and second plastic lenses, a positive diffraction lens structure being formed on at least one surface of surfaces of the first and second plastic lenses, the positive diffraction lens structure functions at least to compensate chromatic aberration caused by refractive powers of the glass lens and the first and second plastic lenses.

In particular, the diffraction lens compensates a longitudinal chromatic aberration caused by refractive powers of the glass lens and the first and second plastic lenses.

Further, a lateral chromatic aberration is compensated by configuration of the glass lens and the first and second plastic lenses.

In particular, each of the glass lens and the first and second plastic lenses are positive lenses.

In this case, it is preferable that the following conditions are satisfied.

$0.10 < \phi d/\phi t < 0.25;$ $\phi p1/\phi t < 0.50;$ and $\phi p2/\phi t < 0.50,$ where,
  $\phi d$ represents power of the diffraction lens structure;
  $\phi t$ represents power of the reading lens as a whole;
  $\phi p1$ represents power of the first plastic lens; and
  $\phi p2$ represents power of the second plastic lens.

Alternatively, the glass lens having a positive power, one of the first and second plastic lenses having a negative power, the other of the first and second plastic lenses having a positive power.

In this case, it is preferable that the following conditions are satisfied.

$0.02 < \phi d/\phi t < 0.20;$ $|\phi p1/\phi g| < 0.85;$ and $|\phi p2/\phi g| < 0.85,$ where,
  $\phi d$ represents power of the diffraction lens structure;
  $\phi t$ represents power of the reading lens as a whole;
  $\phi p1$ represents power of the first plastic lens;
  $\phi p2$ represents power of the second plastic lens; and
  $\phi g$ represents power of the glass lens.

Preferably, the reading lens includes an aperture stop, and the surface on which the diffraction lens structure is formed to face the aperture stop.

DESCRIPTION OF THE ACCOMPANYING DRAWINGS

FIG. 1 shows a lens arrangement of a reading lens according to a first embodiment of the invention;

FIGS. 2A through 2D are graphs showing various aberrations of the reading lens shown in FIG. 1:

FIG. 7 shows a lens arrangement of a reading lens according to a fourth embodiment of the invention;

FIGS. 8A through 8D are graphs showing various aberrations of the reading lens shown in FIG. 7:

FIG. 11 shows a lens arrangement of a reading lens according to a sixth embodiment of the invention;

FIGS. 12A through 12D are graphs showing various aberrations of the reading lens shown in FIG. 11:

FIG. 13 shows a lens arrangement of a reading lens according to a seventh embodiment of the invention;

FIGS. 14A through 14D are graphs showing various aberrations of the reading lens shown in FIG. 13:

FIG. 17 shows a lens arrangement of a reading lens according to a ninth embodiment of the invention;

FIGS. 18A through 18D are graphs showing various aberrations of the reading lens shown in FIG. 17:

FIG. 23 shows a lens arrangement of a reading lens according to a twelfth embodiment of the invention; and FIGS. 24A through 24D are graphs showing various aberrations of the reading lens shown in FIG. 23:

DESCRIPTION OF THE PREFERRED EMBODIMENTS

Figure 3:
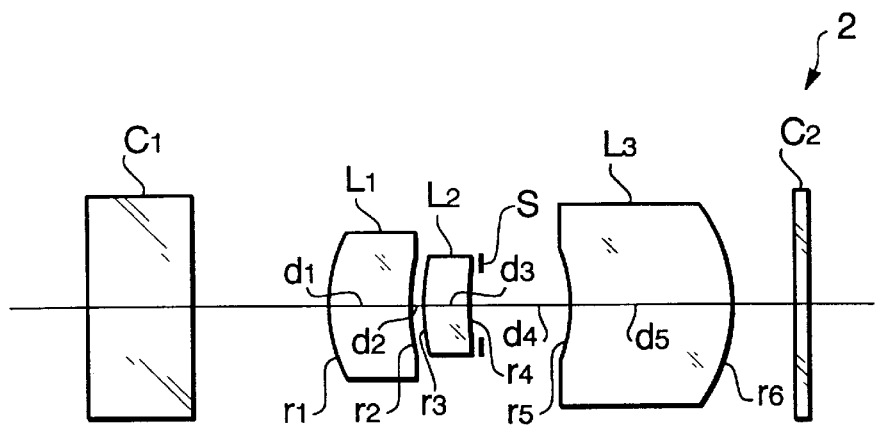
FIG. 3 shows a lens arrangement of a reading lens according to a second embodiment of the invention.

The reading lens according to a first to twelfth embodiments will be described below with reference to the accompanying drawings.

Each reading lens according to the embodiments is a triplet-type reading lens consisting of a first lens L1, a second lens L2, and a third lens L3 from an object side (left-hand side of a drawing). A first cover glass C1 is provided on the object side of the first lens L1, and a second cover glass C2 is provided on an image side (i.e., a right-hand side in a drawing) of the third lens L3. For example, in FIG. 1, the reading lens 1 has the first cover glass C1, the first, second and third lenses L1, L2 and L3, and the second cover glass C2, which are arranged from the object side (the left-hand side in FIG. 1) to the image side (the right-hand side in FIG. 1) in this order.

In FIGS. 1, 3, 5, 7, ..., 23, symbols r1 and r2 respectively denote an object side surface and an image side surface of the first lens L1; symbols r3 and r4 respectively denote an object side surface and an image side surface of the second lens L2; and symbols r5 and r6 respectively denote an object side surface and an image side surface of the third lens L3. Further, d1 represents a distance between the surfaces r1 and r2; d2 represents a distance between the surfaces r2 and r3; d3 represents a distance between the surfaces r3 and r4; d4 represents a distance between the surfaces r4 and r5; and d5 represents a distance between the surfaces r5 and r6. Further, a diffraction lens surface for compensating chromatic aberration is formed on one surface of the plastic lenses.

In the first and second embodiments, all the lenses L1–L3 are positive, while in the third through twelfth embodiments, two lenses are positive, and one lens is negative. Power and material (i.e., glass or plastic) of each lens for each embodiment is indicated in Table 1. In Table 1, "+" represents a positive power, "−" represents a negative power, "P" represents a plastic lens and "G" represents a glass lens. For example, "P/+" represents a plastic lens having a positive power.

TABLE 1

| Embodiment # | L1 | L2 | L3 |
|---|---|---|---|
| 1 | G/+ | P/+ | P/+ |
| 2 | G/+ | P/+ | P/+ |
| 3 | P/+ | P/− | G/+ |
| 4 | P/+ | P/− | G/+ |
| 5 | G/+ | P/− | P/+ |
| 6 | G/+ | P/− | P/+ |
| 7 | P/+ | G/+ | P/− |
| 8 | P/+ | G/+ | P/− |
| 9 | P/+ | P/− | G/+ |
| 10 | P/+ | P/− | G/+ |
| 11 | P/+ | P/− | G/+ |
| 12 | P/+ | P/− | G/+ |

If all of the three lenses are positive lenses, it is preferable that the following conditions (1) and (2) are satisfied.

$$0.10 < \phi d/\phi t < 0.25 \quad (1)$$

$$\phi pi/\phi t < 0.50 \quad (2)$$

where, $\phi t$ represents power of total lens system;

$\phi d$ represents power of the diffraction lens; and $\phi pi$ represents power of the i-th (i=1, 2) plastic lens.

If the reading lens includes one negative lens and two positive lenses, it is preferable that one of the positive lenses is a glass lens, and the following conditions (3) and (4) are satisfied.

$$0.02 < \phi d/\phi t < 0.20 \quad (3)$$

$$|\phi pi/\phi g| < 0.85 \quad (4)$$

where, $\phi g$ represents power of the glass lens.

The condition (1) or (3) is a condition for determining a power of the diffraction lens surface. If $\phi d/\phi t$ is smaller than the lower limit of the condition (1) or (3), correction of longitudinal chromatic aberration is insufficient, while the correction is excessive if $\phi d/\phi t$ is greater than the upper limit of the condition (1) or (3). Only when the condition (1) or (3) is satisfied, the reading lens is applicable to a color imaging device.

The condition (2) or (4) is a condition for restraining power variation due to change of environment condition such as temperature, humidity and the like. If $\phi pi/\phi t$ or $\phi pi/\phi g$ is greater than the upper limit, power burden to the plastic lenses is excessive, and in such a case, power variation, which causes a shift of a focus position, due to change of environment condition becomes large. It is possible to design the lens system so that the power variations due to temperature change are compensated by employing positive and negative lenses. However, as the power variation of plastic lens is caused not only by temperature, but also by humidity or the like, it is preferable to satisfy the above conditions in order to restrain power variation due to the above factors.

It should be noted that, in order to make the secondary spectrum of the chromatic aberration small with keeping lateral chromatic aberration small, it is preferable to form the diffraction lens surface on a surface facing an aperture stop.

Generally, a direction of chromatic aberration of a lens system on one side with respect to the aperture stop is opposite to the chromatic aberration on the other side of the aperture stop. When a diffraction lens surface is provided, chromatic aberration occurs. The quantity of the chromatic aberration is greater as the diffraction lens surface is located farther from the aperture stop. In order to cancel the chromatic aberration caused by the diffraction lens, it is necessary to use another diffraction lens on the opposite side with respect to the aperture stop since the chromatic aberration cause by the diffraction lens is difficult to be canceled by the configuration of refraction lenses. Thus, it is not preferable to form the diffraction lens structure apart from the aperture stop. If the diffraction lens is provided at a position which is relatively close to the aperture stop, the chromatic aberration caused is sufficiently small, and the other diffraction lens may be omitted. Thus, it is preferable that the diffraction lens is located at a position close to the aperture stop.

According to embodiments described hereinafter, lateral chromatic aberration is compensated by configuration of refraction lenses (i.e., the lenses are constituted such that the lateral chromatic aberration is compensated without the diffraction lens structure), and longitudinal chromatic aberration of the reading lens is compensated by the diffraction lens surface. Thus, the diffraction lens can be arranged at a position relatively close to the aperture stop, e.g., a position at which the diffraction lens surface faces the aperture stop.

Hereinafter, twelve (12) embodiments of the invention will be explained. In the first to eighth embodiments, a thickness of the first cover glass C1 is 5.00 mm, and a thickness of the second cover glass C2 is 0.70 mm. In the ninth to twelfth embodiments, a thickness of the first cover glass C1 is 1.50 mm, and a thickness of the second over glass C2 is 0.70 mm.

In each embodiment, the diffraction lens structure is formed on the image-side surface of one of the plastic lenses. Further, in each embodiment, except the ninth embodiment, the diffraction lens surface faces the aperture stop.

The diffraction lens surface is expressed by a macroscopic shape of the surface, and an optical path length to be added (i.e., a microscopic shape), by the diffraction lens structure, to the macroscopic shape. Specifically, the macroscopic shape is expressed by a radius of curvature of the macroscopic shape, and the additional optical path length (i.e., an optical path difference) is expressed by an optical path difference function which defines the optical path difference as a function of a height h with respect to an optical axis.

The optical path difference $\Delta\phi(h)$ to be added by the diffraction lens structure is represented by the following equation (5):

$$\Delta\phi(h)=(P2h^2+P4h^4)\times 2\pi[\text{rad.}] \quad (5)$$

where, P2 and P4 are coefficients of second- and fourth-order terms, respectively. In equation (5), when the second-order coefficient P2 is negative, the diffraction lens structure has negative power in the paraxial region. Further, if the fourth-order coefficient P4 is positive, a negative power of the diffraction lens structure is increased from the center towards the periphery thereof.

In practice, the microscopic shape is determined to have Fresnel lens like stepped shape by canceling an integral multiple of a wavelength from the additional optical path length. The additional optical path length $\Delta\phi'(h)$ is represented by equation (6):

$$\Delta\phi'(h)=[\text{MOD}(P2h^2 +P4h^4+\text{Const}, 1)-\text{Const}]\times 2\pi \quad (6)$$

where, Const is a constant value (0<Const<1) setting a phase at boundaries of zones, and MOD (x, y) is a function which gives a remainder when x is divided by y. Values of h when MOD($P2h^2+P4h^4+\text{Const}$, 1) equals zero (0) represent the boundaries of zones. The diffraction lens surface is formed by providing zones on a base curve (i.e., the macroscopic shape) such that the optical path expressed by equation (6) is added. It should be noted that in the following embodiments, Const equals 0.5.

Hereinafter, an arrangement of the lenses and a numerical structure of each embodiment will be described with reference to the drawings and tables. In tables, F denotes an F-number, f denotes a focal length (unit: mm), w denotes half an angle of view (unit: degree), M denotes a magnification, r denotes a radius of curvature (unit: mm), d denotes a thickness of a lens or a distance between lenses (unit: mm), nd denotes a refractive index of each lens at d-line (588 nm), and v denotes the Abbe's number. Further, in drawings and tables, ri (i=1, 2, . . . ) denotes surface of the lenses, di (i=1, 2, . . . ) denotes a distance between surfaces ri and r(i+1), and S represents an aperture.

In the embodiments, some of the surfaces, including the macroscopic shape of the diffraction lens surface are formed to be a rotationally-symmetrical aspherical surface. The rotationally-symmetrical aspherical surface is expressed by formula (7):

$$X = \frac{Ch^2}{1+\sqrt{1-(1+K)c^2h^2}} + A4h^4 + A6h^6 + A8h^8 \quad (7)$$

where,

X represents a distance from a tangential plane of an spherical vertex (i.e., a sag amount);

h represents a distance from the optical axis of the aspherical surface;

C represents a curvature (1/r) of the aspherical surface at the optical axis thereof;

K is a conic constant; and

A4, A6, A8 are aspherical coefficients of fourth-order, sixth-order, and eighth-order.

First Embodiment

FIG. 1 shows a lens arrangement of the reading lens 1 according to the first embodiment. A numerical structure is indicated in Table 2.

In the reading lens 1, the first lens L1 is a positive glass lens;

the second lens L2 is a positive plastic lens; and the third lens L3 is a positive plastic lens.

Further, the diffraction lens structure is formed on the image side surface of the second lens L2 (i.e., surface r4). The macroscopic shape of diffraction lens surface r4, surfaces r5 and r6 of the third lens L3 are formed to be rotationally-symmetrical aspherical surfaces, respectively. In Table 2, the diffraction lens surface is indicated with a mark "*". The conic constant K, the aspherical coefficients of fourth-order, sixth-order, and eighth-order A4, A6 and A8, the second-order and fourth-order coefficients P2 and P4 of the diffraction lens structure are indicated in Table 3.

TABLE 2

| F 1:6.0 surface | f = 29.35 mm r | w = 10.8° d | m = −0.7559 n | v |
|---|---|---|---|---|
| r1 | 7.135 | 4.00 | 1.56833 | 62.9 |
| r2 | 9.813 | 0.15 | | |
| r3 | 8.469 | 3.00 | 1.49200 | 58.0 |
| *r4 | 7.502 | 0.16 | | |
| S | ∞ | 4.43 | | |

TABLE 2-continued

| F 1:6.0 surface | f = 29.35 mm r | w = 10.8° d | m = -0.7559 n | v |
|---|---|---|---|---|
| r5 | -7.278 | 8.00 | 1.49200 | 58.0 |
| r6 | -8.431 | | | |

TABLE 3

| | r4 | r5 | r6 |
|---|---|---|---|
| K | 0.00000 | 0.00000 | 0.00000 |
| A4 | $7.35696 \times 10^{-4}$ | $7.00084 \times 10^{-4}$ | $-6.07782 \times 10^{-5}$ |
| A6 | $2.12616 \times 10^{-5}$ | $-4.32344 \times 10^{-5}$ | $-1.17050 \times 10^{-6}$ |
| A8 | 0.00000 | 0.00000 | $-1.29040 \times 10^{-8}$ |
| P2 | -5.345 | — | — |
| P4 | -0.024 | — | — |

FIGS. 2A through 2D show graphs showing various aberrations of the reading lens 1. FIG. 2A shows chromatic aberration (unit: mm) represented by spherical aberration for wavelengths of 540 nm, 450 nm, and 620 nm. FIG. 2B shows lateral chromatic aberration (unit: mm) for wavelengths of 450 nm and 620 nm with respect to the aberration for wavelength of 540 nm. FIG. 2C shows astigmatism (S: sagittal direction; M: meridional direction) (unit: mm). FIG. 2D shows distortion (unit: %).

Second Embodiment

FIG. 3 shows a lens arrangement of the reading lens 2 according to the second embodiment. A numerical structure is indicated in Table 4.

In the reading lens 2, the first lens L1 is a positive glass lens;

the second lens L2 is a positive plastic lens; and the third lens L3 is a positive plastic lens.

Further, the diffraction lens structure is formed on the image side surface of the second lens L2 (i.e., surface r4). The macroscopic shape of diffraction lens surface r4, surfaces r5 and r6 of the third lens L3 are formed to be rotationally-symmetrical aspherical surfaces, respectively. In Table 4, the diffraction lens surface is indicated with a mark "*". The conic constant K, the aspherical coefficients of fourth-order, sixth-order, and eighth-order A4, A6 and A8, the second-order and fourth-order coefficients P2 and P4 of the diffraction lens structure are indicated in Table 5.

TABLE 4

| F 1:6.0 surface | f = 29.57 mm r | w = 10.8° d | m = -0.7559 n | v |
|---|---|---|---|---|
| r1 | 7.776 | 4.00 | 1.75500 | 52.3 |
| r2 | 9.961 | 0.72 | | |
| r3 | 10.634 | 2.19 | 1.49200 | 58.0 |
| *r4 | 10.884 | 0.62 | | |
| S | ∞ | 4.58 | | |
| r5 | -7.374 | 8.00 | 1.49200 | 58.0 |
| r6 | -8.391 | | | |

TABLE 5

| | r4 | r5 | r6 |
|---|---|---|---|
| K | 0.00000 | 0.00000 | 0.00000 |
| A4 | $4.45925 \times 10^{-4}$ | $-7.19582 \times 10^{-4}$ | $4.72383 \times 10^{-5}$ |

TABLE 5-continued

| | r4 | r5 | r6 |
|---|---|---|---|
| A6 | $4.95265 \times 10^{-6}$ | $-4.39823 \times 10^{-5}$ | $-1.22086 \times 10^{-6}$ |
| A8 | 0.00000 | 0.00000 | $-4.55621 \times 10^{-9}$ |
| P2 | -5.632 | — | — |
| P4 | -0.012 | — | — |

Figure 4A:
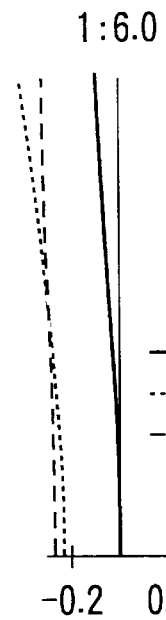
FIGS. 4A through 4D are graphs showing various aberrations of the reading lens shown in FIG. 3.
Figure 4B:
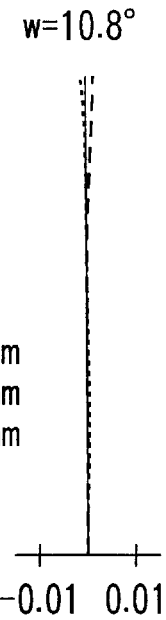
Figure 4C:
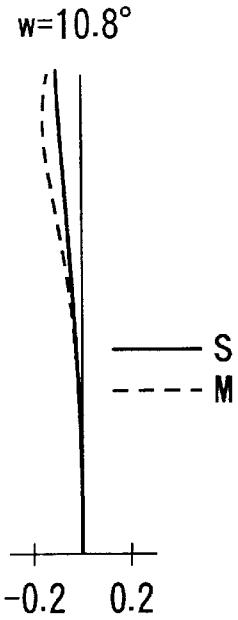
Figure 4D:
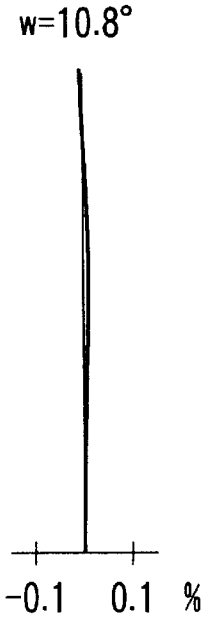

FIGS. 4A through 4D show graphs showing various aberrations of the reading lens 2. FIG. 4A shows chromatic aberration (unit: mm) represented by spherical aberration for wavelengths of 540 nm, 450 nm, and 620 nm. FIG. 4B shows lateral chromatic aberration (unit: mm) for wavelengths of 450 nm and 620 nm with respect to the aberration for wavelength of 540 nm. FIG. 4C shows astigmatism (S: sagittal direction; M: meridional direction) (unit: mm). FIG. 4D shows distortion (unit: %).

Third Embodiment

Figure 5:
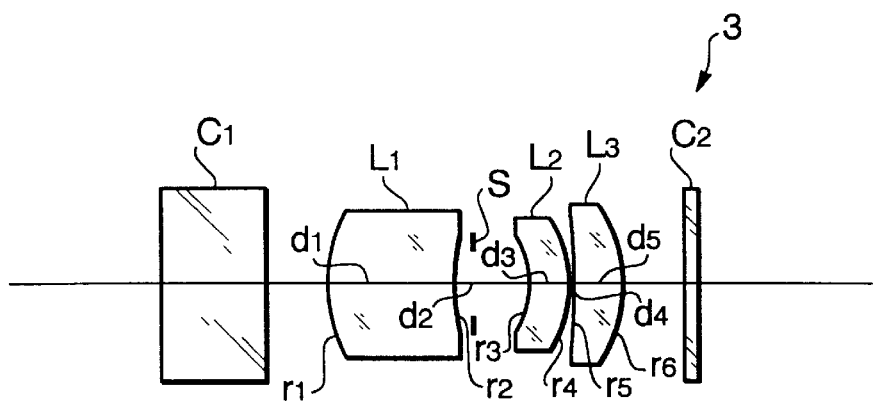
FIG. 5 shows a lens arrangement of a reading lens according to a third embodiment of the invention.

FIG. 5 shows a lens arrangement of the reading lens 3 according to the third embodiment. A numerical structure is indicated in Table 6.

In the reading lens 3, the first lens L1 is a positive plastic lens;

the second lens L2 is a negative plastic lens; and the third lens L3 is a positive glass lens.

Further, the diffraction lens structure is formed on the image side surface of the first lens L1 (i.e., surface r2). The macroscopic shape of diffraction lens surface r2, surfaces r1 of the first lens L1, and surface r4 of the second lens L2 are formed to be rotationally-symmetrical aspherical surfaces, respectively. In Table 6, the diffraction lens surface is indicated with a mark "*". The conic constant K, the aspherical coefficients of fourth-order, sixth-order, and eighth-order A4, A6 and A8, the second-order and fourth-order coefficients P2 and P4 of the diffraction lens structure are indicated in Table 7.

TABLE 6

| F 1:6.0 surface | f = 28.56 mm r | w = 11.8° d | m = -0.7559 n | v |
|---|---|---|---|---|
| r1 | 7.399 | 6.26 | 1.49200 | 58.0 |
| *r2 | 6.555 | 0.80 | | |
| S | ∞ | 2.78 | | |
| r3 | -4.089 | 1.95 | 1.49200 | 58.0 |
| r4 | -6.358 | 0.20 | | |
| r5 | -38.749 | 2.49 | 1.43925 | 94.7 |
| r6 | -6.818 | | | |

TABLE 7

| | r1 | r2 | r4 |
|---|---|---|---|
| K | 0.00000 | 0.00000 | 0.00000 |
| A4 | $1.19082 \times 10^{-4}$ | $7.96646 \times 10^{-4}$ | $-4.74519 \times 10^{-5}$ |
| A6 | $4.40075 \times 10^{-7}$ | $3.02702 \times 10^{-5}$ | $1.12794 \times 10^{-6}$ |
| A8 | $1.24629 \times 10^{-7}$ | 0.00000 | 0.00000 |
| P2 | — | -3.824 | — |
| P4 | — | -0.023 | — |

Figures 6A, 6B, 6C, 6D:
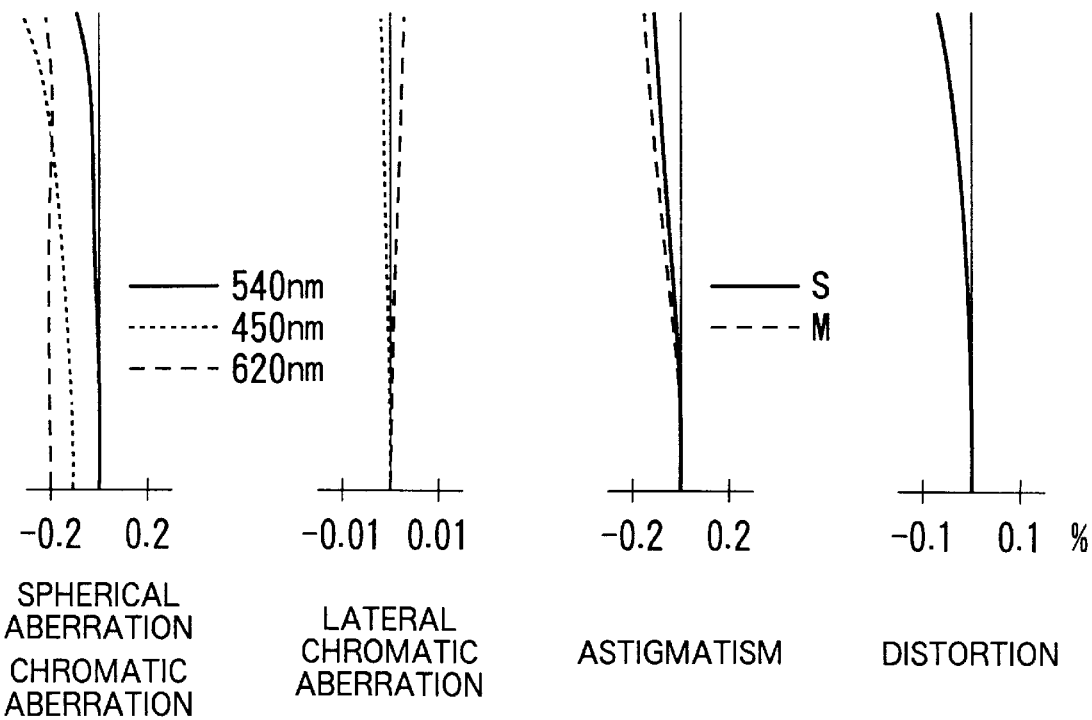
FIGS. 6A through 6D are graphs showing various aberrations of the reading lens shown in FIG. 5.

FIGS. 6A through 6D show graphs showing various aberrations of the reading lens 3. FIG. 6A shows chromatic aberration (unit: mm) represented by spherical aberration for wavelengths of 540 nm, 450 nm, and 620 nm. FIG. 6B shows lateral chromatic aberration (unit: mm) for wavelengths of 450 nm and 620 nm with respect to the aberration for wavelength of 540 nm. FIG. 6C shows astigmatism (S: sagittal direction; M: meridional direction) (unit: mm). FIG. 6D shows distortion (unit: %).

Fourth Embodiment

FIG. 7 shows a lens arrangement of the reading lens 4 according to the fourth embodiment. A numerical structure is indicated in Table 6.

In the reading lens 4, the first lens L1 is a positive plastic lens;

the second lens L2 is a negative plastic lens; and the third lens L3 is a positive glass lens.

Further, the diffraction lens structure is formed on the image side surface of the first lens L1 (i.e., surface r2). The macroscopic shape of diffraction lens surface r2, surfaces r1 of the first lens L1, and surface r4 of the second lens L2 are formed to be rotationally-symmetrical aspherical surfaces, respectively. In Table 8, the diffraction lens surface is indicated with a mark "*". The conic constant K, the aspherical coefficients of fourth-order, sixth-order, and eighth-order A4, A6 and A8, the second-order and fourth-order coefficients P2 and P4 of the diffraction lens structure are indicated in Table 9.

TABLE 8

| F 1:6.0 surface | f = 28.14 mm r | w = 11.6° d | m = −0.7559 n | v |
|---|---|---|---|---|
| r1 | 7.820 | 5.88 | 1.49200 | 58.0 |
| *r2 | 7.327 | 1.60 | | |
| S | ∞ | 1.17 | | |
| r3 | −4.159 | 2.17 | 1.59000 | 30.0 |
| r4 | −6.615 | 0.10 | | |
| r5 | −51.523 | 1.93 | 1.43925 | 94.7 |
| r6 | −6.818 | | | |

TABLE 9

| | r1 | r2 | r4 |
|---|---|---|---|
| K | 0.00000 | 0.00000 | 0.00000 |
| A4 | 1.84027 × 10⁻⁴ | 8.09973×10⁻⁴ | 3.33507× 10⁻ |
| A6 | 1.51636 × 10⁻⁶ | 4.98160×10⁻⁵ | −1.81402×10⁻⁶ |
| A8 | 2.13444 × 10⁻⁷ | 0.00000 | 0.00000 |
| P2 | — | −2.130 | — |
| P4 | — | −0.010 | — |

FIGS. 8A through 8D show graphs showing various aberrations of the reading lens 4. FIG. 8A shows chromatic aberration (unit: mm) represented by spherical aberration for wavelengths of 540 nm, 450 nm, and 620 nm. FIG. 8B shows lateral chromatic aberration (unit: mm) for wavelengths of 450 nm and 620 nm with respect to the aberration for wavelength of 540 nm. FIG. 8C shows astigmatism (S: sagittal direction; M: meridional direction) (unit: mm). FIG. 8D shows distortion (unit: %).

Fifth Embodiment

Figure 9:
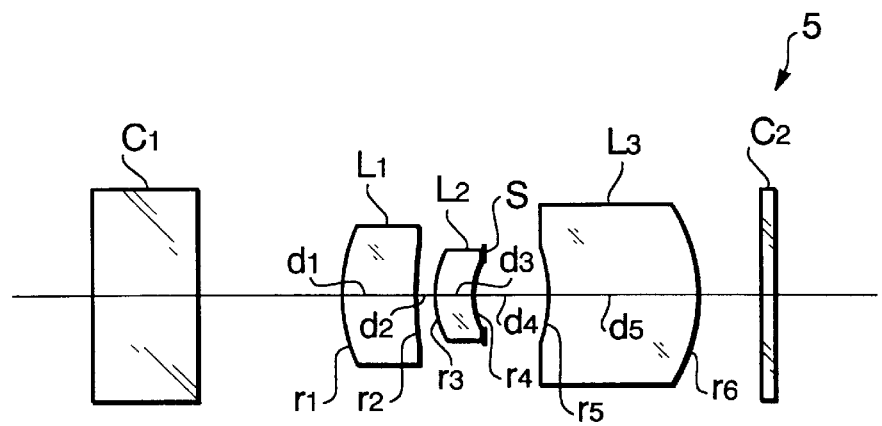
FIG. 9 shows a lens arrangement of a reading lens according to a fifth embodiment of the invention.

FIG. 9 shows a lens arrangement of the reading lens 5 according to the fifth embodiment. A numerical structure is indicated in Table 4.

In the reading lens 5, the first lens L1 is a positive glass lens;

the second lens L2 is a negative plastic lens; and the third lens L3 is a positive plastic lens.

Further, the diffraction lens structure is formed on the image side surface of the second lens L2 (i.e., surface r4). The macroscopic shape of diffraction lens surface r4, surfaces r5 and r6 of the third lens L3 are formed to be rotationally-symmetrical aspherical surfaces, respectively. In Table 10, the diffraction lens surface is indicated with a mark "*". The conic constant K, the aspherical coefficients of fourth-order, sixth-order, and eighth-order A4, A6 and A8, the second-order and fourth-order coefficients P2 and P4 of the diffraction lens structure are indicated in Table 11.

TABLE 10

| F 1:6.0 surface | f = 28.78 mm r | w = 11.0° d | m = −0.7559 n | v |
|---|---|---|---|---|
| r1 | 8.437 | 3.72 | 1.51633 | 64.1 |
| r2 | 25.184 | 0.77 | | |
| r3 | 5.638 | 1.84 | 1.49200 | 58.0 |
| *r4 | 4.172 | 0.35 | | |
| S | ∞ | 3.40 | | |
| r5 | −7.944 | 7.43 | 1.49200 | 58.0 |
| r6 | −8.636 | | | |

TABLE 11

| | r4 | r5 | r6 |
|---|---|---|---|
| K | 0.0000 | 0.00000 | 0.00000 |
| A4 | 7.87538×10⁻⁵ | −6.96475×10⁻⁴ | −1.10522×10⁻⁴ |
| A6 | −9.54959×10⁻⁶ | −3.43909×10⁻⁵ | −9.78503×10⁻⁷ |
| A8 | 0.00000 | 0.00000 | −5.46916×10⁻⁸ |
| P2 | −4.851 | — | — |
| P4 | −0.075 | — | — |

Figures 10A, 10B, 10C, 10D:
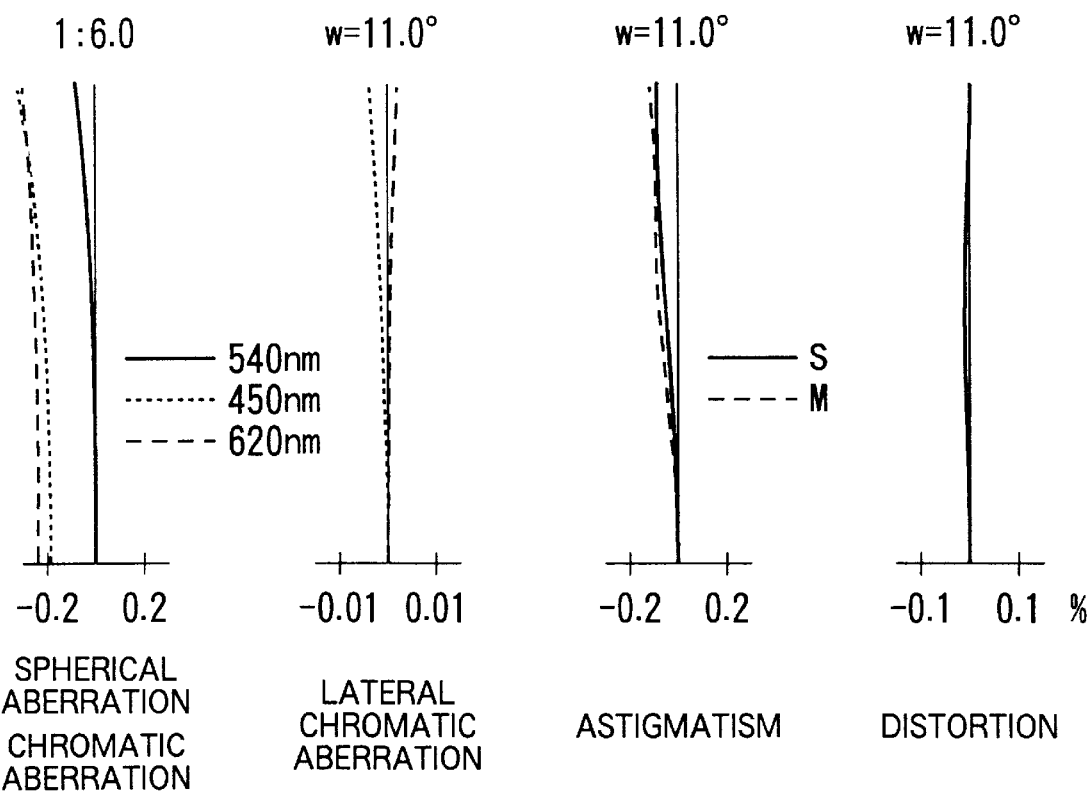
FIGS. 10A through 10D are graphs showing various aberrations of the reading lens shown in FIG. 9.

FIGS. 10A through 10D show graphs showing various aberrations of the reading lens 5. FIG. 10A shows chromatic aberration (unit: mm) represented by spherical aberration for wavelengths of 540 nm, 450 nm, and 620 nm.

FIG. 10B shows lateral chromatic aberration (unit: mm) for wavelengths of 450 nm and 620 nm with respect to the aberration for wavelength of 540 nm. FIG. 10C shows astigmatism (S: sagittal direction; M: meridional direction) (unit: mm). FIG. 10D shows distortion (unit:

Sixth Embodiment

FIG. 11 shows a lens arrangement of the reading lens 6 according to the sixth embodiment. A numerical structure is indicated in Table 12.

In the reading lens 6, the first lens L1 is a positive glass lens;

the second lens L2 is a negative plastic lens; and the third lens L3 is a positive plastic lens.

Further, the diffraction lens structure is formed on the image side surface of the second lens L2 (i.e., surface r4). The macroscopic shape of diffraction lens surface r4, surfaces r5 and r6 of the third lens L3 are formed to be rotationally-symmetrical aspherical surfaces, respectively. In Table 12, the diffraction lens surface is indicated with a mark "*". The conic constant K, the aspherical coefficients of fourth-order, sixth-order, and eighth-order A4, A6 and A8, the second-order and fourth-order coefficients P2 and P4 of the diffraction lens structure are indicated in Table 13.

TABLE 12

| F 1:6.0 surface | f = 29.37 mm r | w = 11.3° d | m = −0.7559 n | v |
|---|---|---|---|---|
| r1 | 9.028 | 4.11 | 1.77250 | 49.6 |
| r2 | 17.619 | 0.47 | | |
| r3 | 8.565 | 1.51 | 1.59000 | 30.0 |
| *r4 | 5.579 | 0.20 | | |
| S | ∞ | 5.54 | | |
| r5 | −9.756 | 7.95 | 1.49200 | 58.0 |
| r6 | −9.135 | | | |

TABLE 13

| | r4 | r5 | r6 |
|---|---|---|---|
| K | 0.00000 | 0.00000 | 0.00000 |
| A4 | 1.96621×10⁻⁴ | −4.69532×10⁻⁴ | −5.86827×10⁻⁵ |
| A6 | 1.43618×10⁻⁶ | −1.93274×10⁻⁵ | −7.68046×10⁻⁷ |
| A8 | 0.00000 | 0.00000 | −1.46574×10⁻⁸ |
| P2 | −4.571 | — | — |
| P4 | −0.038 | — | — |

FIGS. 12A through 12D show graphs showing various aberrations of the reading lens 5. FIG. 12A shows chromatic aberration (unit: mm) represented by spherical aberration for wavelengths of 540 nm, 450 nm, and 620 nm. FIG. 12B shows lateral chromatic aberration (unit: mm) for wavelengths of 450 nm and 620 nm with respect to the aberration for wavelength of 540 nm. FIG. 12C shows astigmatism (S: sagittal direction; M: meridional direction) (unit: mm). FIG. 12D shows distortion (unit: %).

Seventh Embodiment

FIG. 13 shows a lens arrangement of the reading lens 7 according to the seventh embodiment. A numerical structure is indicated in Table 14.

In the reading lens 7, the first lens L1 is a positive plastic lens;

the second lens L2 is a positive glass lens; and the third lens L3 is a negative plastic lens.

Further, the diffraction lens structure is formed on the image side surface of the first lens L1 (i.e., surface r2). The macroscopic shape of diffraction lens surface r2, surfaces r5 and r6 of the third lens L3 are formed to be rotationally-symmetrical aspherical surfaces, respectively. In Table 14, the diffraction lens surface is indicated with a mark "*". The conic constant K, the aspherical coefficients of fourth-order, sixth-order, and eighth-order A4, A6 and A8, the second-order and fourth-order coefficients P2 and P4 of the diffraction lens structure are indicated in Table 15.

TABLE 14

| F 1:6.0 surface | f = 27.35 mm r | w = 11.1° d | m = −0.7559 n | v |
|---|---|---|---|---|
| r1 | 6.369 | 3.70 | 1.49200 | 58.0 |
| *r2 | 5.282 | 1.93 | | |
| S | ∞ | 1.00 | | |
| r3 | −24.577 | 5.20 | 1.51633 | 64.1 |
| r4 | −7.500 | 0.84 | | |
| r5 | 6.791 | 1.56 | 1.49200 | 58.0 |
| r6 | 5.029 | | | |

TABLE 15

| | r2 | r5 | r6 |
|---|---|---|---|
| K | 0.00000 | 0.00000 | 0.00000 |
| A4 | 5.56193×10⁻⁴ | −1.86406×10⁻³ | −3.00102×10⁻³ |
| A6 | 4.28644×10⁻⁵ | 2.01510×10⁻⁵ | 2.92265×10⁻⁵ |
| A8 | 0.00000 | 0.00000 | −1.41208×10⁻⁶ |
| P2 | −3.817 | — | — |
| P4 | −0.037 | — | — |

FIGS. 14A through 14D show graphs showing various aberrations of the reading lens 7. FIG. 14A shows chromatic aberration (unit: mm) represented by spherical aberration for wavelengths of 540 nm, 450 nm, and 620 nm. FIG. 14B shows lateral chromatic aberration (unit: mm) for wavelengths of 450 nm and 620 nm with respect to the aberration for wavelength of 540 nm. FIG. 14C shows astigmatism (S: sagittal direction; M: meridional direction) (unit: mm). FIG. 14D shows distortion (unit:

Eighth Embodiment

Figure 15:
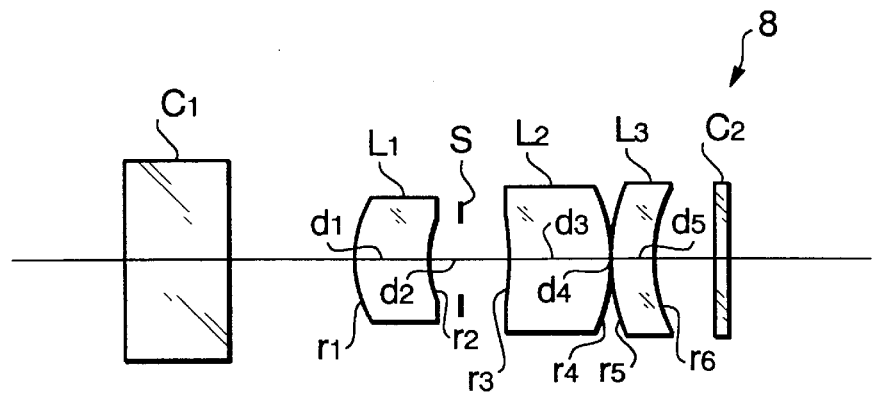
FIG. 15 shows a lens arrangement of a reading lens according to an eighth embodiment of the invention.

FIG. 15 shows a lens arrangement of the reading lens 8 according to the eighth embodiment. A numerical structure is indicated in Table 16.

In the reading lens 8, the first lens L1 is a positive plastic lens;

the second lens L2 is a positive glass lens; and the third lens L3 is a negative plastic lens.

Further, the diffraction lens structure is formed on the image side surface of the first lens L1 (i.e., surface r2). The macroscopic shape of diffraction lens surface r2, surfaces r5 and r6 of the third lens L3 are formed to be rotationally-symmetrical aspherical surfaces, respectively. In Table 16, the diffraction lens surface is indicated with a mark "*". The conic constant K, the aspherical coefficients of fourth-order, sixth-order, and eighth-order A4, A6 and A8, the second-order and fourth-order coefficients P2 and P4 of the diffraction lens structure are indicated in Table 17.

TABLE 16

| F 1:6.0 surface | f = 27.38 mm r | w = 11.4° d | m = −0.7559 n | v |
|---|---|---|---|---|
| r1 | 6.414 | 3.70 | 1.49200 | 58.0 |
| *r2 | 5.390 | 1.60 | | |
| S | ∞ | 2.35 | | |
| r3 | −28.683 | 5.20 | 1.51633 | 64.1 |
| r4 | −8.041 | 0.00 | | |
| r5 | 7.879 | 2.12 | 1.59000 | 30.0 |
| r6 | 5.933 | | | |

TABLE 17

| | r2 | r5 | r6 |
|---|---|---|---|
| K | 0.00000 | 0.00000 | 0.00000 |
| A4 | 4.65862×10⁻⁴ | −4.20289×10⁻⁴ | −1.59932×10⁻³ |
| A6 | 2.77242×10⁻⁵ | 4.54040×10⁻⁶ | 7.09245×10⁻⁶ |
| A8 | 0.00000 | 0.00000 | −3.88877×10⁻⁷ |
| P2 | −3.396 | — | — |
| P4 | −0.031 | — | — |

Figures 16A, 16B, 16C, 16D:
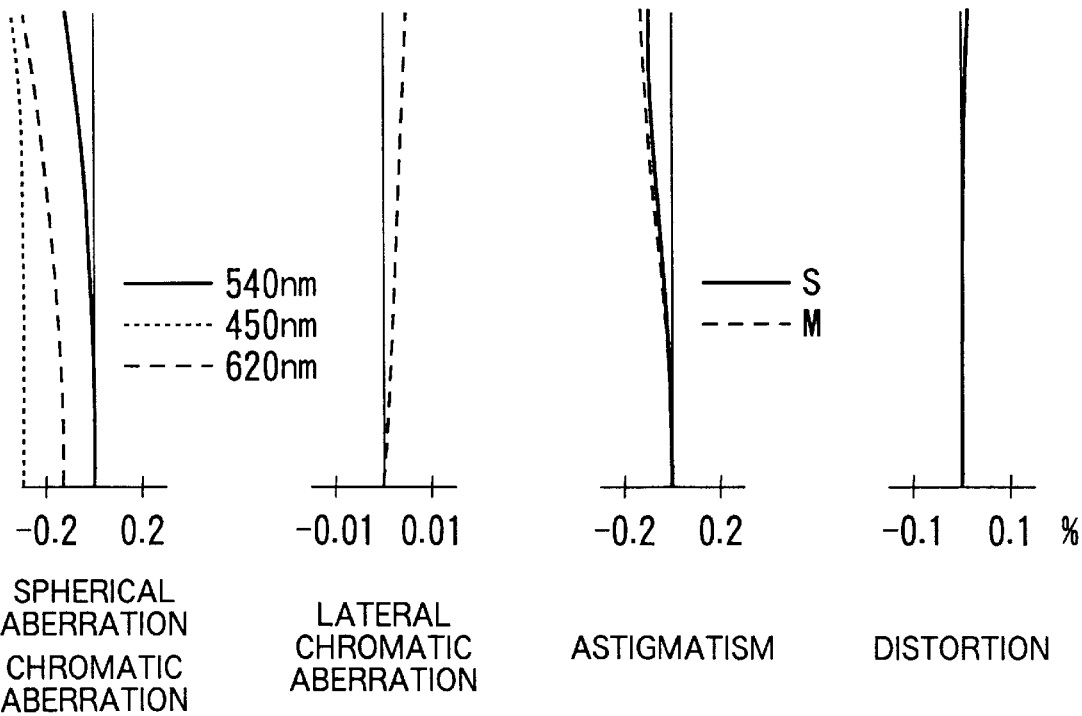
FIGS. 16A through 16D are graphs showing various aberrations of the reading lens shown in FIG. 15.

FIGS. 16A through 16D show graphs showing various aberrations of the reading lens 8. FIG. 16A shows chromatic aberration (unit: mm) represented by spherical aberration for wavelengths of 540 nm, 450 nm, and 620 nm. FIG. 16B shows lateral chromatic aberration (unit: mm) for wavelengths of 450 nm and 620 nm with respect to the aberration for wavelength of 540 nm. FIG. 16C shows astigmatism (S: sagittal direction; M: meridional direction) (unit: mm). FIG. 16D shows distortion (unit: %).

Ninth Embodiment

FIG. 17 shows a lens arrangement of the reading lens 9 according to the ninth embodiment. A numerical structure is indicated in Table 18.

In the reading lens 9, the first lens L1 is a positive plastic lens;

the second lens L2 is a negative plastic lens; and the third lens L3 is a positive glass lens.

Further, the diffraction lens structure is formed on the image side surface of the first lens L1 (i.e., surface r2). The macroscopic shape of diffraction lens surface r2, and surface r3 of the second lens L3 are formed to be rotationally-symmetrical aspherical surfaces, respectively. In Table 18, the diffraction lens surface is indicated with a mark "*". The conic constant K, the aspherical coefficients of fourth-order, sixth-order, and eighth-order A4, A6 and A8, the second-order and fourth-order coefficients P2 and P4 of the diffraction lens structure are indicated in Table 19.

TABLE 18

| F 1:5.4 surface | f = 26.95 mm r | w = 23.5° d | m = −0.124 n | v |
|---|---|---|---|---|
| r1  | 6.409    | 4.00 | 1.49200 | 58.0 |
| *r2 | 6.136    | 1.06 |         |      |
| r3  | −14.470  | 1.00 | 1.59000 | 30.0 |
| r4  | −727.215 | 0.20 |         |      |
| S   | ∞        | 0.41 |         |      |
| r5  | 31.272   | 1.20 | 1.83481 | 42.7 |
| r6  | −21.350  |      |         |      |

TABLE 19

|    | r2            | r3            |
|----|---------------|---------------|
| K  | 0.00000       | 0.00000       |
| A4 | 4.33274×10$^{-4}$ | 6.43786×10$^{-5}$ |
| A6 | 3.07341×10$^{-5}$ | 0.00000       |
| A8 | 0.00000       | 0.00000       |
| P2 | −2.788        | —             |
| P4 | −0.020        | —             |

FIGS. 18A through 18D show graphs showing various aberrations of the reading lens 9. FIG. 18A shows chromatic aberration (unit: mm) represented by spherical aberration for wavelengths of 540 nm, 450 nm, and 520 nm. FIG. 18B shows lateral chromatic aberration (unit: mm) for wavelengths of 450 nm and 620 nm with respect to the aberration for wavelength of 540 nm. FIG. 18C shows astigmatism (S: sagittal direction; M: meridional direction) (unit: mm). FIG. 18D shows distortion (unit: %).

Tenth Embodiment

Figure 19:
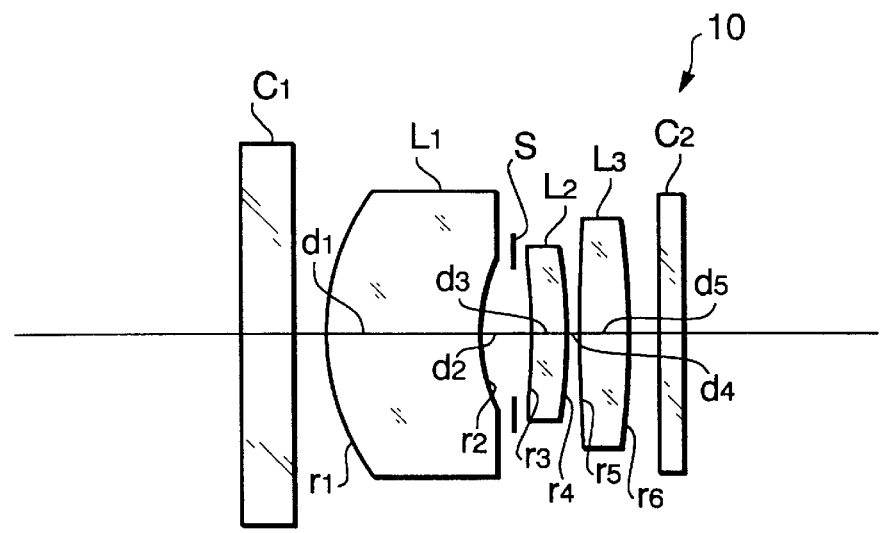
FIG. 19 shows a lens arrangement of a reading lens according to a tenth embodiment of the invention.

FIG. 19 shows a lens arrangement of the reading lens 10 according to the tenth embodiment. A numerical structure is indicated in Table 20.

In the reading lens 10, the first lens L1 is a positive plastic lens;

the second lens L2 is a negative plastic lens; and the third lens L3 is a positive glass lens.

Further, the diffraction lens structure is formed on the image side surface of the first lens L1 (i.e., surface r2). The macroscopic shape of diffraction lens surface r2 and surface r4 of the second lens L2 are formed to be rotationally-symmetrical aspherical surfaces, respectively. In Table 20, the diffraction lens surface is indicated with a mark "*". The conic constant K, the aspherical coefficients of fourth-order, sixth-order, and eighth-order A4, A6 and A8, the second-order and fourth-order coefficients P2 and P4 of the diffraction lens structure are indicated in Table 15.

TABLE 20

| F 1:5.4 surface | f = 26.89 mm r | w = 23.5° d | m = −0.124 n | v |
|---|---|---|---|---|
| r1  | 6.762   | 4.50 | 1.52538 | 56.3 |
| *r2 | 5.878   | 0.94 |         |      |
| S   | ∞       | 0.58 |         |      |
| r3  | −13.074 | 1.00 | 1.59000 | 30.0 |
| r4  | −18.585 | 0.43 |         |      |
| r5  | 99.771  | 1.42 | 1.88300 | 40.8 |
| r6  | −24.395 |      |         |      |

TABLE 21

|    | r2            | r4            |
|----|---------------|---------------|
| K  | 0.00000       | 0.00000       |
| A4 | 5.34382×10$^{-4}$ | −2.29299×10$^{-4}$ |
| A6 | 6.89532×10$^{-5}$ | −3.11751×10$^{-5}$ |
| A8 | 0.00000       | 0.00000       |
| P2 | −4.296        | —             |
| P4 | −0.033        | —             |

Figures 20A, 20B, 20C, 20D:
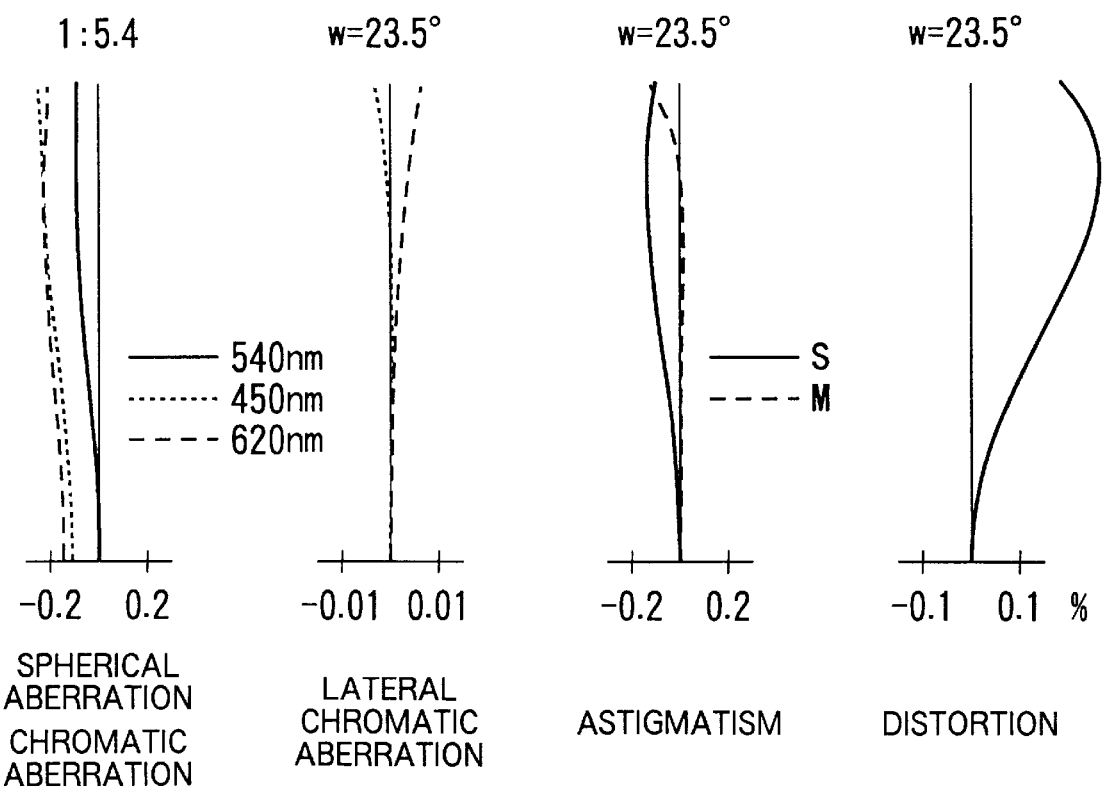
FIGS. 20A through 20D are graphs showing various aberrations of the reading lens shown in FIG. 19.

FIGS. 20A through 20D show graphs showing various aberrations of the reading lens 10. FIG. 20A shows chromatic aberration (unit: mm) represented by spherical aberration for wavelengths of 540 nm, 450 nm, and 620 nm. FIG. 20B shows lateral chromatic aberration (unit: mm) for wavelengths of 450 nm and 620 nm with respect to the aberration for wavelength of 540 nm. FIG. 20C shows astigmatism (S: sagittal direction; M: meridional direction) (unit: mm). FIG. 20D shows distortion (unit: %).

Eleventh Embodiment

Figure 21:
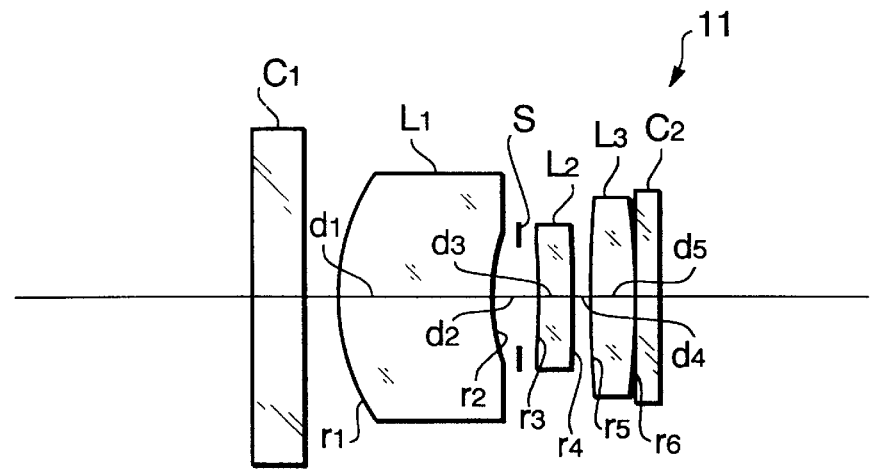
FIG. 21 shows a lens arrangement of a reading lens according to a eleventh embodiment of the invention.

FIG. 21 shows a lens arrangement of the reading lens 11 according to the eleventh embodiment. A numerical structure is indicated in Table 22.

In the reading lens 11, the first lens L1 is a positive plastic lens;

the second lens L2 is a negative plastic lens; and the third lens L3 is a positive glass lens.

Further, the diffraction lens structure is formed on the image side surface of the first lens L1 (i.e., surface r2). The macroscopic shape of diffraction lens surface r2 and surface r3 of the second lens L2 are formed to be rotationally-symmetrical aspherical surfaces, respectively. In Table 22, the diffraction lens surface is indicated with a mark "*". The conic constant K, the aspherical coefficients of fourth-order, sixth-order, and eighth-order A4, A6 and A8, the second-order and fourth-order coefficients P2 and P4 of the diffraction lens structure are indicated in Table 23.

TABLE 22

| F 1:7.0 surface | f = 26.94 mm r | w = 23.6° d | m = -0.124 n | v |
|---|---|---|---|---|
| r1 | 6.800 | 4.50 | 1.49200 | 58.0 |
| *r2 | 6.459 | 0.87 | | |
| S | ∞ | 0.49 | | |
| r3 | -15.898 | 1.00 | 1.59000 | 30.0 |
| r4 | -279.184 | 0.60 | | |
| r5 | 40.623 | 1.35 | 1.88300 | 40.8 |
| r6 | -22.000 | | | |

TABLE 23

| | r2 | r3 |
|---|---|---|
| K | 0.00000 | 0.00000 |
| A4 | 4.50107×10$^{-4}$ | -8.11168×10$^{-5}$ |
| A6 | 3.48831×10$^{-5}$ | -8.44515×10$^{-6}$ |
| A8 | 0.00000 | 0.00000 |
| P2 | -3.285 | — |
| P4 | -0.020 | — |

Figure 22A:
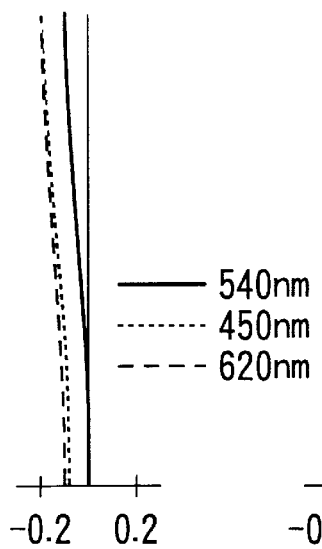
FIGS. 22A through 22D are graphs showing various aberrations of the reading lens shown in FIG. 21.
Figure 22B:
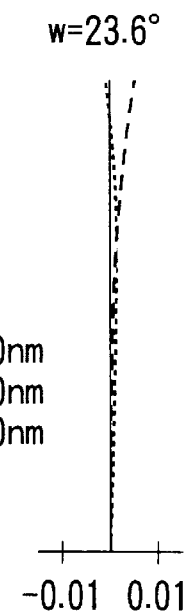
Figure 22C:
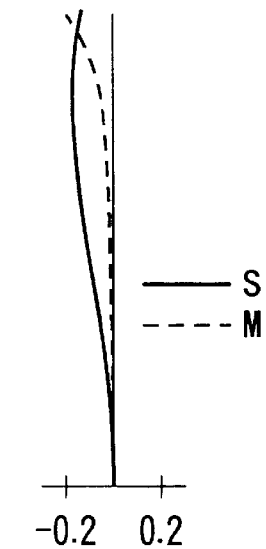
Figure 22D:
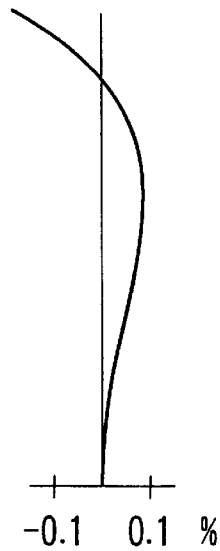

FIGS. 22A through 22D show graphs showing various aberrations of the reading lens 11. FIG. 22A shows chromatic aberration (unit: mm) represented by spherical aberration for wavelengths of 540 nm, 450 nm, and 620 nm. FIG. 22B shows lateral chromatic aberration (unit: mm) for wavelengths of 450 nm and 620 nm with respect to the aberration for wavelength of 540 nm. FIG. 22C shows astigmatism (S: sagittal direction; M: meridional direction) (unit: mm). FIG. 22D shows distortion (unit: %).

Twelfth Embodiment

FIG. 23 shows a lens arrangement of the reading lens 12 according to the twelfth embodiment. A numerical structure is indicated in Table 24.

In the reading lens 12, the first lens L1 is a positive plastic lens;

the second lens L2 is a negative plastic lens; and the third lens L3 is a positive glass lens.

Further, the diffraction lens structure is formed on the image side surface of the first lens L1 (i.e., surface r2). The macroscopic shape of diffraction lens surface r2 and surface r4 of the second lens L2 are formed to be rotationally-symmetrical aspherical surfaces, respectively. In Table 24, the diffraction lens surface is indicated with a mark "*". The conic constant K, the aspherical coefficients of fourth-order, sixth-order, and eighth-order A4, A6 and A8, the second-order and fourth-order coefficients P2 and P4 of the diffraction lens structure are indicated in Table 25.

TABLE 24

| F 1:7.0 surface | f = 26.94 mm r | w = 23.5° d | m = -0.124 n | v |
|---|---|---|---|---|
| r1 | 6.742 | 4.47 | 1.52538 | 56.3 |
| *r2 | 5.811 | 0.89 | | |
| S | ∞ | 0.59 | | |
| r3 | -11.306 | 1.00 | 1.52538 | 56.3 |
| r4 | -16.561 | 0.48 | | |
| r5 | 72.553 | 1.28 | 1.77250 | 49.6 |
| r6 | -21.308 | | | |

TABLE 25

| | r2 | r4 |
|---|---|---|
| K | 0.00000 | 0.00000 |
| A4 | 5.43504×10$^{-4}$ | -2.74782×10$^{-4}$ |
| A6 | 6.13687×10$^{-5}$ | -3.04356×10$^{-5}$ |
| A8 | 0.00000 | 0.00000 |
| P2 | -4.251 | — |
| P4 | -0.033 | — |

FIGS. 24A through 24D show graphs showing various aberrations of the reading lens 12. FIG. 24A shows chromatic aberration (unit: mm) represented by spherical aberration for wavelengths of 540 nm, 450 nm, and 620 nm. FIG. 24B shows lateral chromatic aberration (unit: mm) for wavelengths of 450 nm and 620 nm with respect to the aberration for wavelength of 540 nm. FIG. 24C shows astigmatism (S: sagittal direction; M: meridional direction) (unit: mm). FIG. 24D shows distortion (unit: %).

Table 26 indicates values of $\phi d/\phi t$ and $|\phi pi/\phi t|$ for the first and second embodiments.

TABLE 26

| Embodiments | $\phi d/\phi t$ | $\phi p1/\phi t$ | $\phi p2/\phi t$ |
|---|---|---|---|
| First Embodiment | 0.169 | 0.006 | 0.353 |
| Second Embodiment | 0.180 | 0.123 | 0.384 |

As indicated above, conditions (1) and (2):

$$0.10 < \phi d/\phi t < 0.25 \quad (1)$$

$$\phi pi/\phi t < 0.50 \quad (2)$$

are satisfied in the first and second embodiments.

Table 27 indicates values of $\phi d/\phi t$ and $|\phi pi/\phi g|$ for the third through twelfth embodiments.

TABLE 27

| Embodiments | $\phi d/\phi t$ | $|\phi p1/\phi g|$ | $|\phi p2/\phi g|$ |
|---|---|---|---|
| Third Embodiment | 0.118 | 0.230 | 0.567 |
| Fourth Embodiment | 0.065 | 0.220 | 0.625 |
| Fifth Embodiment | 0.151 | 0.409 | 0.289 |
| Sixth Embodiment | 0.145 | 0.591 | 0.355 |
| Seventh Embodiment | 0.113 | 0.038 | 0.340 |
| Eighth Embodiment | 0.100 | 0.058 | 0.300 |
| Ninth Embodiment | 0.080 | 0.200 | 0.610 |
| Tenth Embodiment | 0.120 | 0.200 | 0.280 |
| Eleventh Embodiment | 0.100 | 0.210 | 0.570 |
| Twelfth Embodiment | 0.120 | 0.180 | 0.300 |

As shown in Table 27, for the third through twelfth embodiments, conditions (3) and (4):

$$0.02 < \phi d/\phi t < 0.20 \quad (3)$$

$$|\phi pi/\phi g| < 0.85 \quad (4)$$

are satisfied.

As described above, according to the present invention, two plastic lenses are utilized in the triplet-type reading lens to reduce the cost, and by forming a diffraction lens structure on one of the surfaces of the plastic lenses, longitudinal chromatic aberration can be compensated so that the reading lens can be employed in a color imaging apparatus such as a color scanner an the like.

The present disclosure relates to subject matter contained in Japanese Patent Application No. HEI 09-219892, filed on Jul. 31, 1997, which is expressly incorporated herein by in its entirety.

What is claimed is:

1. A reading lens consisting of one glass lens and first and second plastic lenses, a positive diffraction lens structure being formed on one of surfaces of said first and second plastic lenses, said positive diffraction lens structure functions at least to compensate chromatic aberration caused by refractive powers of said glass lens and said first and second plastic lenses.

2. The reading lens according to claim 1, wherein said diffraction lens compensates a longitudinal chromatic aberration caused by refractive powers of said glass lens and said first and second plastic lenses.

3. The reading lens according to claim 2, wherein a lateral chromatic aberration is compensated by configuration of said glass lens and said first and second plastic lenses.

4. The reading lens according to claim 2, wherein each of said glass lens and said first and second plastic lenses are positive lenses.

5. The reading lens according to claim 4, which satisfies conditions:

$$0.10 < \phi d/\phi t < 0.25;$$

$$\phi p1/\phi t < 0.50;$$

and $$\phi p2/\phi t < 0.50,$$

wherein, $\phi d$ represents power of said diffraction lens structure;

$\phi t$ represents power of said reading lens as a whole;

$\phi p1$ represents power of said first plastic lens; and $\phi p2$ represents power of said second plastic lens.

6. The reading lens according to claim 2, said glass lens having a positive power, one of said first and second plastic lenses having a negative power, the other of said first and second plastic lenses having a positive power.

7. The reading lens according to claim 6, which satisfies conditions:

$$0.02 < \phi d/\phi t < 0.20;$$

$$|\phi p1/\phi g| < 0.85;$$

and $$|\phi p2/\phi g| < 0.85,$$

wherein, $\phi d$ represents power of said diffraction lens structure;

$\phi t$ represents power of said reading lens as a whole;

$\phi p1$ represents power of said first plastic lens;

$\phi p2$ represents power of said second plastic lens; and $\phi g$ represents power of said glass lens.

8. The reading lens according to claim 2, which includes an aperture stop, and wherein one of said surfaces of said first and second plastic lenses, on which said diffraction lens structure is formed faces said aperture stop.

9. A reading lens consisting of one glass lens and first and second plastic lenses, a positive diffraction lens structure being formed on one of surfaces of said first and second plastic lenses, said positive diffraction lens structure functions at least to compensate chromatic aberration caused by refractive powers of said glass lens and said first and second plastic lenses, and an aperture stop, wherein one of the surfaces of said first and second plastic lenses, on which said diffraction lens structure is formed, faces said aperture stop.

* * * * *